United States Patent [15] 3,681,408
Kaneko et al. [45] Aug. 1, 1972

[54] 17α-ACETOXY-7α-ALKYLTHIOPROGESTERONES AND PRODUCTION THEREOF

[72] Inventors: Hidehiko Kaneko; Yuzuru Yamamoto; Tatsuya Kon, all of Osaka-fu, Japan

[73] Assignee: Dainippon Pharmaceutical Co., Ltd., Osaka-shi, Japan

[22] Filed: Oct. 13, 1969

[21] Appl. No.: 866,013

[52] U.S. Cl..............................260/397.4, 424/243
[51] Int. Cl..............................................C07c 169/32
[58] Field of Search ....../Machine Searched Steroids; 260/397.4

[56] References Cited

UNITED STATES PATENTS 3,022,323  2/1962  Schaub et al. .............260/397.3

FOREIGN PATENTS OR APPLICATIONS 1,195,746  7/1965  Germany...................260/397.4

Primary Examiner—Lewis Gotts
Assistant Examiner—Ethel G. Love
Attorney—Jacobs & Jacobs

[57]  ABSTRACT

17α-Acetoxy-7α-alkylthioprogesterones of the formula:

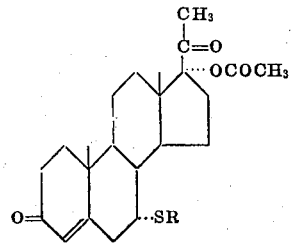

wherein R is a lower alkyl group useful as progestational agents, particularly suited for oral administration, which are prepared by reacting 17α-acetoxypregna-4,6-diene-3,20-dione with alkyl mercaptan in the presence of a catalytic substance, preferably a quaternary ammonium type ion exchange resin.

6 Claims, No Drawings

17α-ACETOXY-7α-ALKYLTHIOPROGESTERONES AND PRODUCTION THEREOF

The present invention relates to 17α-acetoxy-7α-alkylthioprogesterones and production thereof.

The said 17α-acetoxy-7α-alkylthioprogesterones are representable by the formula:

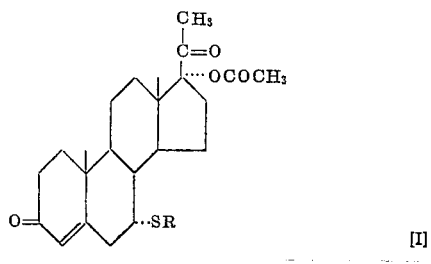

Wherein R is a lower alkyl group (e.g., methyl, ethyl, n-propyl, isopropyl, n-butyl), the term "lower" being intended to mean the one having one to five carbon atoms. The 17α-acetoxy-7α-alkyl-thioprogesterones [I] are novel and useful as progestational agents, particularly suited for oral administration.

According to the present invention, the 17α-acetoxy-7α-alkylthioprogesterone [I] is prepared by reacting 17α-acetoxypregna-4,6-diene-3,20-dione with alkyl mercaptan (e.g., methyl mercaptan, ethyl mercaptan, n-propyl mercaptan, isopropyl mercaptan, n-butyl mercaptan) in the presence of a catalytic substance such as an acid (e.g., hydrochloric acid, hydrobromic acid) or a base (e.g., sodium hydroxide, potassium hydroxide, sodium ethoxide, triethylamine, piperidine), if desired, in a solvent (e.g., methanol, ethanol, acetonitrile, tetrahydrofuran, dioxane, dimethylformamide).

Among various catalytic substances, the use of a quaternary ammonium type ion exchange resin is particularly preferred in shortness in the reaction time, high yield of the product, easiness in separation of the catalyst from the reaction mixture, use of the catalyst with repetition and the like. Specific examples of such ion exchange resin include a hydrophilic resin (e.g., Amberlite IRA-441, Dowex 2×8), a hydrophobic resin (e.g., Amberlist A-29), etc.

When an ion exchange resin is employed as the catalyst, a mixture of the starting $\Delta^{4,6}$-steroid, the reagent alkyl mercaptan and the resin (in an equal to three time amount to the steroid), if desired, in the said solvent may be stirred at room temperature (e.g., 10° to 20°C) overnight or heated at 50° to 80°C for 2 to 5 hours so that the reaction preceeds with facility.

The 17α-acetoxy-7α-alkylthioprogesterones [I] thus produced generally exhibit an excellent progestational activity without any substantial androgenic or estrogenic action.

For instance, in the Clauberg test using rabbits [Journal of Physiology, 83, 145 (1935)], the progestational activity of 17α-acetoxy-7α-methylthioprogesterone [I: R = CH$_3$] is 10 times that of a known progestational agent, i.e., 17α-acetoxyprogesterone. Further, the former is 30 times as potent as the latter in the anti-ovualuational activity and six times as strong as the latter in the deciduomata formation activity. Other 17α-acetoxy-7α-alkylthioprogesterones [I] possess the similar high progestational activity.

For the practical use of these 17α-acetoxy-7α-alkylthioprogesterones [I] as progestational agents, they may be incorporated in a conventional dosage form such as powder, tablet, pill, capsule, solution, emulsion, suspension or the like along with the necessary pharmaceutically acceptable carrier material, excipient, lubricant, buffer or the like.

Practical and presently preferred embodiments of the present invention are illustratively shown in the following examples.

EXAMPLE 1

17α-Acetoxy-7α-methylthioprogesterone:

A mixture of methyl mercaptan (25 ml) and dioxane (25 ml) and quaternary ammonium type ion exchange resin Amberlist A-29 (OH-type) (manufactured by Rohm & Haas Co.) (2.5 g) are added to 17α-acetoxypregna-4,6-diene-3,20-dione (3 g). The resultant mixture is stirred at room temperature for 24 hours and filtered to eliminate the ion exchange resin. The filtrate is concentrated under reduced pressure to give crude crystals (3.1 g) of the objective compound. Recrystallization from methanol affords pure crystals (2.8 g) melting at 200° to 203°C. $[\alpha]_D^{20}$ -4.9° (C = 1.4 in chloroform). $\lambda_{max}^{EtOH}$ 240 μ (ε: 15,400). Anal. Calcd. for $C_{24}H_{34}O_4S$: C, 68.86; H, 8.19; S, 7.66. Found: C, 68.70; H, 8.21; S, 7.56.

EXAMPLE 2

17α-Acetoxy-7α-ethylthioprogesterone:

Ethyl mercaptan (100 ml) and quaternary ammonium type ion exchange resin Amberlist A-29 (OH-type) (manufactured by Rohm & Haas Co.) (5 g) are added to 17α-acetoxypregna-4,6-diene-3,20-dione (5 g), and the resulting mixture is heated with reflux for 2 hours. After removal of the ion exchange resin by filtration, the filtrate is concentrated under reduced pressure to give crude crystals (5.5 g) of the objective compound. Recrystallization from acetone affords pure crystals (5.2 g) melting at 224° to 227°C. $[\alpha]_D^{27}$-19.9° (C = 1.00 in chloroform). $\lambda_{max}^{EtOH}$ 241 μ (ε: 16,700). Anal. Calcd. for $C_{25}H_{36}O_4S$: C, 69.40; H, 8.39; S, 7.41. Found: C, 69.45; H, 8.25; S, 7.28.

EXAMPLE 3

17αAcetoxy-7α-n-propylthioprogesterone:

n-Propyl mercaptan (80 ml) and quaternary ammonium type ion exchange resin Amberlite IRA-441 (OH-type) (manufactured by Rohm & Haas Co.) (3 g) are added to 17α-acetoxypregna-4,6-diene-3,20-dione (3 g), and the resultant mixture is heated at 50°C for 3 hours while stirring. After removal of the ion exchange resin by filtration, the filtrate is concentrated under reduced pressure to give crude crystals (3.2 g) of the objective compound. Rescrystallization from acetone affords pure crystals (3.0 g) melting at 191° to 193°C. $[\alpha]_D^{27}$ -29.8° (C = 0.99 in chloroform). $\lambda_{max}^{EtOH}$ 241 μ (ε: 16,800). Anal. Calcd. for $C_{26}H_{38}O_4S$: C, 69.91; H, 8.58; S, 7.18. Found: C, 69.80; H, 8.38; S, 6.98.

EXAMPLE 4

17α-Acetoxy-7α-isopropylthioprogesterone:

Isopropyl mercaptan (80 ml) and quaternary ammonium type ion exchange resin Amberlist A-29 (OH-type) (manufactured by Rohm & Haas Co.) (3 g) are added to 17α-acetoxy-pregna-4,6-diene-3,20-dione (3 g), and the resultant mixture is heated at 60°C for 3 hours while stirring. After removal of the ion exchange resin by filtration, the filtrate is concentrated under reduced pressure to give crude crystals (3.3 g) of the objective compound. Recrystallization from acetone affords pure crystals (3.1 g) melting at 215 to 218°C. $[\alpha]_D^{31}$ −27.9° (C = 1.11 in chloroform). $\lambda_{max}^{EtOH}$ 241 $\mu$ ($\epsilon$: 16,710). Anal. Calcd. for $C_{26}H_{38}O_4S$: C, 69.91; H, 8.58; S, 7.18. Found: C, 69.83; H, 8.59; S, 6.88.

EXAMPLE 5

17α-Acetoxy-7α-butylthioprogesterone:

n-butyl mercaptan (80 ml) and quaternary ammonium type ion exchange resin Amberlist A–29 (OH-type) (manufactured by Rohm & Haas Co.) (3 g) are added to 17α-acetoxypregna-4,6-diene-3,20-dione (3 g), and the resultant mixture is heated at 60°C for 3 hours while stirring. After removal of the ion exchange resin by filtration, the filtrate is concentrated under reduced pressure to give crude crystals (3.4 g) of the objective compound. Recrystallization from acetone-hexane affords pure crystals (3.2 g) melting at 132° to 133°C. $[\alpha]_D^{31}$ −29.7° (C = 1.19 in chloroform). $\lambda_{max}^{EtOH}$ 241 $\mu$ ($\epsilon$: 16,780). Anal. Calcd. for $C_{27}H_{40}O_4S$: C, 70.39; H, 8.75; S, 6.96. Found: C, 70.65; H, 8.87; S, 6.80.

EXAMPLE 6

| Ingredients | Grams |
| --- | --- |
| 17α-Acetoxy-7α-methylthio-progesterone | 5.0 |
| Lactose | 63.0 |
| Gelatin | 1.0 |
| Corn starch | 25.7 |
| Magnesium stearate | 0.3 |
| Talc | 5.0 |

The above materials are mixed together, granulated and tableted in accordance with a conventional method to give 1,000 tablets, each of which weighs 100 milligrams.

EXAMPLE 7

| Ingredients | Grams |
| --- | --- |
| 17α-Acetoxy-7α-methylthio-progesterone | 5.0 |
| Lactose | 55.0 |
| Gelatin | 1.0 |
| Corn starch | 33.05 |
| Magnesium stearate | 0.4 |
| Talc | 5.5 |
| Ethynyl estradiol | 0.05 |

The above materials are mixed together, granulated and tableted in accordance with a conventional method to give 1,000 tablets, each of which weighs 100 milligrams.

The starting 17α-acetoxypregna-4,6-diene-3,20-dione used for the preparation of 17α-acetoxy-7α-alkylthioprogesterones in the present invention is known [Gazz. Chim. Ital., 91, 545 (1961)].

What is claimed is:

1. A process for the preparation of a 17α-acetoxy-7 α-alkylthioprogesterone wherein the alkylthio group contains from one to five carbon atoms which comprises allowing 17α-acetoxypregna-4,6-diene-3,20-dione to react with an alkyl mercaptan having from one to five carbon atoms in the presence of a quaternary ammonium type ion exchange resin.

2. The process according to claim 1, wherein the lower alkyl mercaptan is methyl mercaptan.

3. The process according to claim 1, wherein the lower mercaptan is ethyl mercaptan.

4. The process according to claim 1, wherein the lower alkyl mercaptan is n-propyl mercaptan.

5. The process according to claim 1, wherein the lower alkyl mercaptan is isopropyl mercaptan.

6. The process according to claim 1, wherein the lower alkyl mercaptan is n-butyl mercaptan.

* * * * *